United States Patent Office 3,226,194
Patented Dec. 28, 1965

3,226,194
PROCESS FOR PRODUCING SILICON NITRIDE
AND A PRODUCT THEREOF
Urban E. Kuntz, East Hartford, Conn., assignor to United
Aircraft Corporation, East Hartford, Conn., a corporation of Delaware
No Drawing. Filed Sept. 10, 1962, Ser. No. 222,662
6 Claims. (Cl. 23—191)

This invention relates to a novel form of silicon nitride and to a method for producing such silicon nitride, and more particularly to a new and improved form of silicon nitride, referred to herein as pyrolytic silicon nitride, and to a method for producing such pyrolytic silicon nitride. The pyrolytic silicon nitride of this invention is characterized by translucency, hardness, chemical inertness, high density, oxidation resistance, low thermal conductivity, electrical insulation properties, high emissivity, a nonporous structure, and especially by prolonged resistance to attack from high-strength caustic solutions at temperatures as high as 500° F.

Among the objects of this invention are to provide a pyrolytic silicon nitride that is of crystallographic density and that is nonporous, hard, and chemically inert.

Among the further objects of this invention are to provide a pyrolytic silicon nitride ($Si_3N_4$) that may be used as a coating or in bulk form wherever electrical insulation, oxidation resistance, high emissivity, low thermal conductivity, and wear resistance are needed.

Among the still further objects of this invention are to provide a pyrolytic silicon nitride that is highly resistant to strong basic media for prolonged periods of time at elevated temperatures, including an 85% aqueous potassium hydroxide solution at 500° F., that forms a good mask for silicon in semiconductors, that may be used as an improved grinding material and that is translucent.

Another object of the invention is to provide structural members of silicon nitride which can be cut to accurate dimensions, ground and polished.

Still another object of the invention is to provide translucent structural members made of pyrolytic silicon nitride.

A further object of the present invention is to provide prefabricated structural members made of pyrolytic silicon nitride having a predetermined design on at least one surface.

It is also the object of this invention to provide a process for producing pyrolytic silicon nitride that has the desirable characteristics set forth above and also structural members made of such pyrolytic silicon nitride.

Additional objects and advantages of the invention will be set forth in part in the description which follows and in part will be obvious from the description, or may be learned by practice of the invention, the objects and advantages being realized and attained by means of the compositions, articles and methods particularly pointed out in the appended claims.

To achieve the foregoing objects and in accordance with its purpose, this invention provides a new and improved form of silicon nitride, or pyrolytic silicon nitride, and a process for making it.

The pyrolytic silicon nitride of this invention has a bulk density which is at least 96 percent of theoretical crystallographic density, or between about 96.7 and 100 percent of theoretical crystallographic density. (Theoretical crystallographic density for silicon nitride ($Si_3N_4$) is 3.184 gms./cc.) The silicon nitride of this invention is also characterized by translucency, hardness, chemical inertness, oxidation resistance, high emissivity, low thermal conductivity, wear resistance, and nonporosity. It is a good electrical insulator, and is resistant to high-strength caustic solutions at high temperatures, such as an 85% aqueous solution of potassium hydroxide at 500° F. These properties and characteristics give the pyrolytic silicon nitride of this invention a utility, for example, as a high-temperature window, and as an ancillary device or insulator for use in fuel cells. Silicon nitride structural members produced in accordance with this invention have all of the above properties and additionally may be made in a variety of shapes and configurations which can be cut, ground and polished. These structural members may have either flat or curved surfaces.

Additionally, the silicon nitride of this invention has a hardness approaching that of diamonds, and is, therefore, also useful as a grinding material.

Broadly described, the process of this invention for forming pyrolytic silicon nitride includes within its scope the steps of establishing a hot surface in an environment having a temperature of at least 1200° C., and preferably between about 1200° C. and 1550° C. or higher, i.e., up to about 1900° C., and passing a gaseous mixture containing silicon halide and ammonia over the hot surface. The silicon halide is preferably silicon tetrafluoride ($SiF_4$).

The mole percent of ammonia in the gas stream may be varied to vary the rate of deposition. Preferably, the mole percent of ammonia in the gas stream based on silicon halide and ammonia is about 50 to 85 percent.

The reaction is best carried out in vacuo. Absolute pressures of less than about 300 mm. of mercury and preferably less than 100 mm. of mercury are preferred. Optimum results are obtained at absolute pressures of less than 20 mm. of mercury or between about 1 and 10 mm. of mercury. When prepared in this manner, pyrolytic silicon nitride has a degree of preferred crystallographic orientation with the "c" axis normal to the hot surface on which the silicon nitride is formed. This crystallographic orientation may be enhanced by using lower partial pressures of the silicon halide in the gaseous mixture.

Rather than conducting the reaction in vacuo, a carrier gas may be employed, and the reaction conducted at ordinary atmospheric pressure or even super-atmospheric pressure. Suitable carrier gases include nitrogen and the noble gases, such as neon, krypton, argon and the like.

Regardless of whether vacuum or carrier gas is employed, the combined partial pressure of ammonia and silicon halide in contact with the hot surface should be less than about 300 mm. of mercury and preferably less than 100 mm. of mercury. Particularly good results are obtained when the combined partial pressure of the reactant gases is less than 10 mm. of mercury, or between about 1 and 10 mm. of mercury.

Although the reaction can be carried out at higher pressures, e.g., up to atmospheric and even above, use of higher pressures may result in reaction in the gaseous phase away from the hot surface. Such reaction may lead to formation of solid reaction products in the atmosphere surrounding the hot surface which might clog the equipment and hamper operation. Reaction away from the hot surface may also lead to low yield of the desirable deposited silicon nitride.

The hot surface on which the silicon nitride is deposited must be one which is resistant to thermal decomposition at the temperatures indicated. Suitable materials which may be mentioned and which are preferred for use include graphite, alumina, hot-pressed boron nitride, hot-pressed silicon nitride, and boron nitride which has been deposited from boron trifluoride and ammonia by a process similar to the process of this invention.

The rate of deposition of pyrolytic silicon nitride on the hot surface has been found to increase with temperature. The rate of deposition is dependent on pressure and concentration of reactant gases as well as temperature. Varying these conditions permits good control of the rate. For example, at a temperature of 1450° C., an absolute pressure of 7 mm. of mercury, and a molar ratio of ammonia to silicon tetrafluoride of about 4:1, the rate of deposition is about $7 \times 10^{-3}$ inch per hour.

The silicon nitride formed by the process is translucent, almost transparent, when polished with diamond polishing paste, and may be colored white, green, brown or black. The lower temperatures and lower pressures and percentages of ammonia favor the lighter colors.

The substratum containing the deposited pyrolytic silicon nitride may be used as such, or the substratum may be removed, as by burning, volatilization or dissolution to yield a dense, nonporous structural member of silicon nitride. The structural member of silicon nitride may have flat or curved surfaces, depending on the configuration of the surface on which the silicon nitride is deposited.

For a clearer understanding of this invention, specific examples of the invention are given below. These examples are merely illustrative and are not to be understood as limiting the scope or underlying principles of the invention.

*Example I*

Plates of silicon nitride 3" x 3" x 0.04" were prepared as follows:

Ammonia and silicon tetrafluoride ($SiF_4$) were separately but simultaneously introduced into one end of a graphite cylinder 6 inches long with an inside diameter of 3 3/16 inches. The exit end of the cylinder was vented to a vacuum pump. The molar ratio of ammonia to silicon tetrafluoride introduced was 4 to 1. The ammonia was introduced at a rate of 0.096 mole per minute and the silicon tetrafluoride at a rate of 0.024 mole per minute for a total rate of reactants of 0.12 mole per minute. The cylinder contained a graphite plate 3" x 3" x 1/4" lying in its center with the plane of the plate parallel to the cylinder axis and the cylinder was resistively heated to 1450° C., as measured by a pyrometer sighted through a small hole in the cylinder wall.

An absolute pressure of 8.3 mm. of mercury was maintained in the system, and the process was continued for about 8 hours, by the end of which time a deposit about 0.04 inch thick had been built up on the graphite plate. The graphite substratum was removed by burning to leave two dense continuous pieces of silicon nitride measuring about 3" x 3" x 0.04".

The product was translucent when polished with diamond paste, hard and nonporous.

Silicon nitride similarly produced was immersed in an 85% aqueous solution of potassium hydroxide at 500° F. for 980 hours without deterioration.

The emissivity of similar material at 5500 angstroms was determined to be 0.91 at 1584° C. and 0.914 at 1700° C.

The density of similar material was 99.7% of theoretical crystallographic density and its hardness was 9+ on the Mohs scale and 2850 on the Vickers scale. Its thermal conductivity was low, being about 11 B.t.u./hr./ft.$^2$/° F./ft. as compared with 211 for copper and about 99 for aluminum. Resistance to thermal shock was excellent. A strip was heated in excess of 400° F. and put in water at 50° F. with no apparent damage. Porosity tests indicated that pores in the specimen varied in size from about 3.0 to 5.5 microns with a mean pore size of 4.1 microns.

*Example II*

Example I was repeated, with the exception that no graphite plate was inserted in the graphite cylinder. The process was continued for about eight hours to deposit a continuous, uniform and nonporous layer of silicon nitride about 0.06 inch thick on the inside surface of the graphite cylinder.

The graphite cylinder was removed from the apparatus and the graphite burned away, leaving a cylinder of silicon nitride 6 inches long having an outside diameter of about 3 3/16 inches and a wall thickness of about 0.06 inch.

A 3.75 inch long section of the silicon nitride member in the form of a half cylinder was bonded to the outside diameter of a brass tube with dop wax, and the specimen was subjected to a machine grinding operation in which the specimen was rotated at approximately 50 r.p.m. while a "fairly coarse" silicon carbide grinding wheel, running at approximately 1500 r.p.m. was brought into contact. The specimen was found to be able to withstand this grinding operation.

The silicon nitride cylinder could be cut into strips of desired dimensions with a diamond saw.

A semi-tubular specimen of the silicon nitride was polished on two opposite sides to form a window. Polishing was done with a diamond paste Amplex Type 15F10 held in a stiff-bristled wide brush mounted in a rotary power hand tool randomly worked over the surface. The polished specimen was translucent and was colored green in some portions and white in other portions. The polished green area would allow reading when a printed page was placed against the opposite side. The polished white area permitted reading when a printed page was held one inch away from the opposite side.

The pyrolytic silicon nitride structural members disclosed herein have utility as high-temperature windows, and as insulators in fuel cells employing high-strength caustic electrolytes at high temperature. They may also be employed as cutting tools for hard materials.

In forming structural members of silicon nitride by the techniques described herein, it has been discovered that the deposit of silicon nitride takes the shape of the hot surface on which it is deposited. For example, if the hot surface is grooved, the surface of the silicon nitride deposit adjacent the hot surface contains the ribs corresponding in shape and position to the grooves. This phenomenon permits silicon nitride structural members having predetermined surface configurations to be made cheaply and easily.

The invention in its broader aspects is not limited to the specific details shown and described, but departures may be made from such details within the scope of the accompanying claims without departing from the process of the invention and without sacrificing its chief advantages.

What is claimed is:

1. A method of producing nonporous silicon nitride corresponding to the formula $Si_3N_4$ that is of crystallographic density which comprises the steps of establishing a hot surface of a member selected from the group consisting of graphite, boron nitride, silicon nitride and alumina in an environment having a temperature of between 1200° and 1900° C. and an absolute pressure of less than about 10 mm. of mercury absolute, and passing a gaseous admixture comprising silicon halide and anhydrous ammonia over the hot surface, the mole percent of ammonia based on the reactant gases being between about 50 and 85 mole percent.

2. A method for producing nonporous silicon nitride corresponding to the formula $Si_3N_4$ that is of crystallographic density which comprises establishing a hot surface of a member selected from the group consisting of graphite, boron nitride, silicon nitride and alumina in an environment having a temperature between about 1200° and 1900° C. and feeding a gaseous mixture comprising silicon halide and anhydrous ammonia over the hot surface, the combined partial pressure of the silicon halide and anhydrous ammonia in the gaseous mixture being less than about 10 mm. of mercury absolute and the mole percent of ammonia based on the recited reactant gases being between about 50 and 85 percent.

3. A method for producing nonporous silicon nitride corresponding to the formula $Si_3N_4$ that is substantially of crystallographic density and that is resistant to high-strength caustic solutions at temperatures of at least about 500° F. which comprises contacting a hot surface which is a member selected from the group consisting of alumina, graphite, boron nitride and silicon nitride at a temperature of at least about 1200° C. with a gaseous mixture of a silicon halide and anhydrous ammonia, the mole percent of ammonia in the gaseous mixture based upon silicon halide and ammonia being between about 50% and 85%, the combined partial pressure of silicon halide and ammonia being less than about 300 mm. of mercury absolute, said hot surface being resistant to the temperature of contact.

4. A method for making structural members of nonporous silicon nitride corresponding to the formula $Si_3N_4$ having a density substantially equal to the crystallographic density of silicon nitride which comprises the steps of establishing a hot surface of a member selected from the group consisting of graphite, boron nitride, silicon nitride and alumina in an environment having a temperature of between 1200° and 1900° C. and an absolute pressure of less than about 10 mm. of mercury absolute, passing a gaseous admixture comprising silicon halide and anhydrous ammonia over the hot surface, the mole percent of ammonia based on the reactant gases being between about 50 and 85 mole percent, continuing passing said gaseous admixture over the hot surface until a deposit of nonporous silicon nitride has been produced, and then separating the silicon nitride deposit from said surface.

5. A method for making structural members of nonporous silicon nitride corresponding to the formula $Si_3N_4$ that is of crystallographic density which comprises establishing a hot surface of a member selected from the group consisting of graphite, boron nitride, silicon nitride and alumina in an environment having a temperature between about 1200° and 1900° C., feeding a gaseous mixture comprising silicon halide and anhydrous ammonia over the hot surface, the combined partial pressure of the silicon halide and anhydrous ammonia in the gaseous mixture being less than about 300 mm. of mercury absolute and the mole percent of ammonia based on the recited reactant gases being between about 50 and 85 percent, continuing feeding said gaseous mixture over the hot surface until a deposit of nonporous silicon nitride has been produced; and then separating the silicon nitride deposit from said surface.

6. As a new article of manufacture, a structural member of silicon nitride corresponding to the formula $Si_3N_4$ and made by the process of claim 5, said structural member being capable of being ground and polished and capable of withstanding immersion in 85% aqueous potassium hydroxide solution at 500° F., said structural member being translucent, and having a density substantially equal to the crystallographic density of silicon nitride, $Si_3N_4$.

References Cited by the Examiner

UNITED STATES PATENTS

| 2,618,565 | 11/1952 | Nicholson | 23—191 X |
| 2,750,268 | 6/1956 | Erasmus et al. | 23—191 X |

FOREIGN PATENTS 505,966  12/1954  Italy.

OTHER REFERENCES

Popper, P., and Ruddlesden, S. N.: "The Preparation, Properties and Structure of Silicon Nitride," Trans. Brit. Ceram. Soc., 60, 1961, pages 603–26.

MAURICE A. BRINDISI, *Primary Examiner.*